US011435442B2

(12) United States Patent
Sudhakar

(10) Patent No.: US 11,435,442 B2
(45) Date of Patent: Sep. 6, 2022

(54) METHOD FOR CAPTURING A SURROUNDING REGION OF A MOTOR VEHICLE WITH OBJECT CLASSIFICATION, CONTROL DEVICE, DRIVER ASSISTANCE SYSTEM AND MOTOR VEHICLE

(71) Applicant: VALEO Schalter und Sensoren GmbH, Bietigheim-Bissingen (DE)

(72) Inventor: Dheeraj Sudhakar, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 713 days.

(21) Appl. No.: 15/775,215

(22) PCT Filed: Oct. 21, 2016

(86) PCT No.: PCT/EP2016/075344
§ 371 (c)(1),
(2) Date: May 10, 2018

(87) PCT Pub. No.: WO2017/080787
PCT Pub. Date: May 18, 2017

(65) Prior Publication Data
US 2018/0321377 A1     Nov. 8, 2018

(30) Foreign Application Priority Data
Nov. 13, 2015   (DE) ...................... 10 2015 119 658.1

(51) Int. Cl.
*G01S 7/41*      (2006.01)
*G01S 13/931*    (2020.01)
(Continued)

(52) U.S. Cl.
CPC ............ *G01S 7/415* (2013.01); *G01S 13/931* (2013.01); *G01S 13/862* (2013.01);
(Continued)

(58) Field of Classification Search
CPC .... G01S 13/931; G01S 13/862; G01S 13/865; G01S 2013/9314–93277;
(Continued)

(56) References Cited

U.S. PATENT DOCUMENTS 7,346,453 B2 * 3/2008 Matsuoka ............... G08G 1/166
                                                            701/301
8,072,370 B2 * 12/2011 Woodington ......... G01S 13/584
                                                            342/70
(Continued)

FOREIGN PATENT DOCUMENTS

CN    103287358 A  *  9/2013  ............ B60R 16/02
DE    196 54 691 A1     7/1997
(Continued)

OTHER PUBLICATIONS

The Notice of Preliminary Rejection issued in corresponding Korean Application No. 10-2018-7013454, dated Feb. 11, 2020 (13 pages).
(Continued)

*Primary Examiner* — Matthew M Barker
(74) *Attorney, Agent, or Firm* — Osha Bergman Watanabe & Burton LLP

(57) ABSTRACT

A method for capturing a surrounding region of a motor vehicle, in which, while the motor vehicle is moved relative to an object in the surrounding region, sensor data are received in each case at predetermined times from a distance sensor by a control device and the object is classified as a static or as a moving object by the control device on the basis of the received sensor data, wherein a distance value is determined by the control device for each of the predetermined times on the basis of the sensor data, said distance value describing a distance between the distance sensor and at least one predetermined point of reflection of the object, and a curve of the distance values as a function of time (t)
(Continued)

is compared to a predetermined reference curve for the purposes of classifying the object.

10 Claims, 3 Drawing Sheets

(51) Int. Cl.
 *G01S 13/86* (2006.01)
 *G05D 1/00* (2006.01)
(52) U.S. Cl.
 CPC ....... *G01S 13/865* (2013.01); *G01S 2013/932* (2020.01); *G01S 2013/9323* (2020.01); *G01S 2013/9324* (2020.01); *G05D 1/0088* (2013.01); *G05D 2201/0213* (2013.01)
(58) Field of Classification Search
 CPC .. G01S 7/41–418; G08G 1/168; B60Q 9/006; B60Q 9/008; G05D 1/0088; G05D 2201/0213; G06K 9/00805
 See application file for complete search history.

(56) References Cited

U.S. PATENT DOCUMENTS

| | | | | |
|---|---|---|---|---|
| 8,730,089 | B2* | 5/2014 | Shimizu | G01S 13/931 342/70 |
| 9,983,294 | B2* | 5/2018 | Oshima | G01S 13/536 |
| 10,371,809 | B2* | 8/2019 | Satou | G01S 13/584 |
| 10,656,269 | B2* | 5/2020 | Matsuura | G08G 1/167 |
| 2010/0019935 | A1 | 1/2010 | Kawabata et al. | |
| 2010/0039311 | A1* | 2/2010 | Woodington | G01S 13/34 342/70 |
| 2011/0295548 | A1* | 12/2011 | Takabayashi | G06K 9/00798 702/142 |
| 2015/0198711 | A1* | 7/2015 | Zeng | G01S 13/9029 342/59 |

FOREIGN PATENT DOCUMENTS

| | | | |
|---|---|---|---|
| DE | 10243508 A1 | 4/2004 | |
| DE | 10 2004 046 873 A1 | 4/2006 | |
| DE | 10 2005 059902 A1 | 6/2007 | |
| DE | 102008043394 A1 | 5/2010 | |
| DE | 10 2012 224 499 A1 | 4/2014 | |
| EP | 2 127 986 A1 | 12/2009 | |
| JP | 2008-207726 A | 9/2008 | |
| JP | 2014-137743 A | 7/2014 | |
| JP | 2015055541 A * | 3/2015 | ........... G01S 13/931 |

OTHER PUBLICATIONS

The Notification of Reason for Rejection issued in corresponding Japanese Application No. 2018-524428, dated Jul. 30, 2019 (5 pages).
International Search Report issued in PCT/EP2016/075344 dated Dec. 21, 2016 (2 pages).
Written Opinion of the International Searching Authority issued in PCT/EP2016/075344 dated Dec. 21, 2016 (8 pages).
German Search Report issued in DE 10 2015 119 658.1 dated Aug. 17, 2016 (10 pages).

* cited by examiner

METHOD FOR CAPTURING A SURROUNDING REGION OF A MOTOR VEHICLE WITH OBJECT CLASSIFICATION, CONTROL DEVICE, DRIVER ASSISTANCE SYSTEM AND MOTOR VEHICLE

The present invention relates to a method for capturing a surrounding region of a motor vehicle, in which, while the motor vehicle is moved relative to an object in the surrounding region, sensor data are received in each case at predetermined times from a distance sensor by means of a control device and the object is classified as a static or as a moving object by means of the control device on the basis of the received sensor data. Moreover, the present invention relates to a control device for a motor vehicle. Further, the present invention relates to a driver assistance system having a distance sensor and such a control device. Finally, the present invention relates to a motor vehicle having such a driver assistance system.

The prior art has disclosed driver assistance systems for motor vehicles, by means of which it is possible to capture a surrounding region of the motor vehicle. To this end, the driver assistance system usually comprises a multiplicity of distance sensors that, for example, can be arranged in distributed fashion on the motor vehicle. By way of example, these distance sensors can emit a transmission signal that is then reflected by an object or an obstacle in the surrounding region of the motor vehicle and that reaches the distance sensor again. Then, the distance between the motor vehicle and the object can be determined on the basis of the time-of-flight between the emission of the transmission signal and the reception of the transmission signal reflected by the object. By way of example, such distance sensors can be ultrasonic sensors, laser scanners, lidar sensors or radar sensors. Further, the prior art has disclosed the use of cameras to capture objects in the surrounding region of the motor vehicle.

In the present case, the interest is directed, in particular, to radar sensors for motor vehicles. By way of example, these radar sensors are operated at a frequency of approximately 24 GHz or approximately 79 GHz. In general, the radar sensors serve to detect an object in a surrounding region of the motor vehicle. The radar sensors can be part of different driver assistance systems that assist the driver in guiding the motor vehicle. Radar sensors firstly measure the distance between the object and the motor vehicle. Secondly, the radar sensors also measure the relative speed in relation to the object. Further, the radar sensors also measure a so-called target angle, i.e. an angle between an imaginary connecting line to the object and a reference line, for instance the vehicle longitudinal axis.

Radar sensors are usually placed behind the bumper, for example in the respective corner regions of the bumper. For the purposes of detecting the target object, the radar sensor emits a transmission signal in the form of an electromagnetic wave. This transmission signal is then reflected at the object to be detected and received again by the radar sensor as an echo. In the present case, the interest is directed, in particular, to so-called frequency modulated continuous wave radar sensors, which are also referred to as FMCW radars. Here, the transmission signal usually comprises a sequence of frequency modulated chirp signals, which are emitted in succession. For the purposes of obtaining a reception signal, the reflected transmission signal is initially down-mixed into the baseband and subsequently sampled by means of an analogue-to-digital converter. Consequently, it is possible to provide a number of sampled values. These sampled values of the reception signal then are processed by means of an electronic computing device. This computing device, which comprises a digital signal processor, for example, is integrated in the radar sensor, in particular.

Usually, a relatively broad azimuthal angle range, which may be 150°, for example, is captured by the radar sensor in the horizontal direction. Thus, the radar sensor has a relatively large azimuthal capture angle, and so the visual field or the capture region of the radar sensor is correspondingly broad in the azimuth direction. This azimuthal capture region can be subdivided into smaller portions which are irradiated in succession by means of the radar sensor. To this end, the main lobe of the transmission antenna is electronically pivoted in the azimuth direction for example, e.g. according to the phase array principle.

To this end, DE 10 2004 046 873 A1 describes a radar sensor and an associated method for distance and speed regulation of a motor vehicle. Here, a temporal change of a point of reflection of the radar radiation at the object is ascertained and a classification of the detected object is ascertained depending on the temporal change of the point of reflection. Advantageously, this object classification is also used, once again, for predicting the object position more accurately. To this end, the change in the point of reflection, in particular, is captured over a predetermined period of time. As a result of this, it is possible to be able to deduce the size of the object by way of object migrations that vary in time.

Further, DE 10 2012 224 499 A1 has disclosed a method for identifying a space of a side strip using an ultrasonic wave sensor, a radar and an imaging apparatus. Using the method, it is possible to identify, in particular, stationary objects, e.g. crash barriers, and moving objects using a Doppler effect of the radar. By way of example, it is possible to monitor whether a distance between a stationary object and the vehicle remains constant for a pre-set time or longer. In this case, the stationary object can then be determined as a crash barrier.

It is an object of the present invention to highlight a solution of how objects in a surrounding region of a motor vehicle can be classified in a simpler and more reliable manner.

According to the invention, this object is achieved by a method, by a control device, by a driver assistance system and by a motor vehicle having the features according to the respective independent claims. Advantageous embodiments of the invention are the subject matter of the dependent claims, the description and the figures.

A method according to the invention serves to capture a surrounding region of a motor vehicle. Here, while the motor vehicle is moved relative to an object in the surrounding region, sensor data are received in each case at predetermined times from a distance sensor by means of a control device and the object is classified as a static or as a moving object by means of the control device on the basis of the received sensor data. Further, a distance value is determined by means of the control device for each of the predetermined times, said distance value describing a distance between the distance sensor and at least one predetermined point of reflection of the object. Further, a curve of the distance values as a function of time is compared to a predetermined reference curve for the purposes of classifying the object.

Using the method, it is possible to capture objects or obstacles in a surrounding region of the motor vehicle. At least one distance sensor is used for capturing the objects. Provision can also be made for use to be made of a plurality of distance sensors which, for example, are arranged at the motor vehicle in a distributed manner. By way of example, the distance sensors can emit a corresponding sensor signal, which is reflected by the at least one object in the surrounding region. Then, the reflected transmission signal returns back to the distance sensor. Then, it is possible to ascertain the distance between the motor vehicle and the object on the basis of the time-of-flight. By way of example, the distance sensor can be an ultrasonic sensor, a laser scanner, a lidar sensor or the like. The distance sensor is preferably a radar sensor, which emits electromagnetic radiation as the transmission signal. The distance sensor is connected to the control device for data transmission purposes. The control device can be formed by a corresponding computing device, a digital signal processor, a microprocessor or the like. In particular, the control device is formed by an electronic controller of the motor vehicle. The sensor data which describe the object in the surrounding region are transmitted from the distance sensor to the control device. The control device can then evaluate the sensor data and classify the object accordingly. In particular, the object can be classified as a static, i.e. non-moving, object or as a moving object.

Now, according to the invention, provision is made for the distance sensor to provide the sensor data continuously or at predetermined times and for the control device to determine a distance value for each of the predetermined times on the basis of the sensor data. The predetermined times can be assigned to respective measurement cycles of the distance sensor. Thus, the control device determines a distance value for each of the predetermined times, said distance value respectively describing the distance between the distance sensor and a predetermined point of reflection at the object. Expressed differently, a predetermined point of reflection at the object is tracked as a function of time. In particular, the point of reflection describes a predetermined point or region on an outer side of the object, at which the transmission signal of the distance sensor is reflected. A plurality of points of reflection can be identified when evaluating the sensor data. These points of reflection describe an outer surface of the object that faces the distance sensor. Consequently, the relative position between the point of reflection of the object and the distance sensor that is arranged at the motor vehicle moving relative to the object can be determined in each case for the predetermined times. The individual distance values that were determined for the predetermined times are now plotted as a function of time. Thus, a time curve of the distance values as a function of time is determined and compared to a predetermined reference curve, which is saved in a memory of the control device, for example. The object can be classified as a static or as a dynamic object on the basis of the comparison of the time curve of the distance values with the reference curve. Consequently, the object can be classified with little computational outlay.

Preferably, the object is classified as a static object if the curve of the distance values as a function of time initially drops and subsequently rises. Here, the predetermined point of reflection of the object is arranged, in particular, in front of the motor vehicle in the direction of travel of the motor vehicle. If the object is static, i.e. if it does not move, and the motor vehicle is moved relative to the object, the distance between the distance sensor and the predetermined point of reflection initially decreases in this case. After the shortest distance between the distance sensor and the point of reflection was reached, the distance between the distance sensor and the point of reflection increases again. This is reflected in the time curve of the distance values as a function of time. Here, it is usually possible to identify a falling curve first, followed by a minimum and then an increasing curve. Consequently, a static object in the surrounding region of the motor vehicle can be recognized in a simple manner on the basis of the comparison of the curve of the distance values as a function of time with the reference curve.

According to one embodiment, the object is classified as a static object, in relation to which the motor vehicle is moved substantially in parallel, if the curve of the distance values as a function of time is parabolic. As already mentioned previously, the curve of the distance values as a function of time initially drops and subsequently rises if the object, relative to which the motor vehicle is moved, is static. Particularly if the motor vehicle is moved in parallel to the static object, a parabolic form emerges for the curve of the distance values as a function of time. Consequently, a classification of the object can be carried out in a simple manner and it is moreover possible to identify how the object is oriented relative to the motor vehicle or relative to the movement direction of the motor vehicle.

According to a preferred embodiment, the object is classified as a crash barrier if the curve of the distance values as a function of time is parabolic. By way of example, if the motor vehicle is on a motorway, it can be moved relative to a crash barrier. Here, the crash barrier is arranged substantially parallel to the direction of travel of the motor vehicle. Here, it is possible to track the predetermined point of reflection at the crash barrier as a function of time. As explained previously, a parabolic curve emerges for the distance values as a function of time. Here, it is furthermore possible to take account of the reflection properties of the crash barrier. Particularly if the distance sensor is embodied as a radar sensor, the sensor data which then describe the electromagnetic radiation reflected by the crash barrier have different signal amplitudes than in the case of an object that is not manufactured from a metallic material. Thus, a distinction can be made, for example by evaluating the sensor data, as to whether the object is a crash barrier, which is manufactured from metal, or a wall, which is manufactured from concrete or wood, for example. Consequently, it is reliably possible to determine that the object captured by the radar sensor is a crash barrier.

Furthermore, it is advantageous if a current speed of the motor vehicle and/or a current direction of travel of the motor vehicle is taken into account for the purposes of classifying the object. Expressed differently, it is also possible to take account of odometry data in addition to the sensor data for the purposes of classifying the object. To this end, it is possible to take account e.g. of the data of sensors that describe the current speed of the motor vehicle and/or a rotational speed of at least one wheel of the motor vehicle. Furthermore, the current steering angle of the motor vehicle can moreover be determined on the basis of the data from a steering angle sensor. The curve of the distance values as a function of time depends on the current vehicle speed and/or the current direction of travel of the motor vehicle. As a result of additionally taking account of the current vehicle speed and/or the current direction of travel, it is possible to verify the curve of the distance values as a function of time and consequently it is possible to classify the object more reliably.

According to a further configuration, a distance between the motor vehicle and the object is determined on the basis of a minimum of the distance values. The curve of the distance values as a function of time has a minimum when the distance sensor has the smallest distance from the point of reflection. On the basis of this information, it is possible to determine the distance between the motor vehicle and the object. If the object is a crash barrier, it is possible to ascertain the width of a hard shoulder, for example. Thus, it is possible to determine, for example, whether this hard shoulder provides sufficient space and the motor vehicle can be parked there in an emergency.

According to a further embodiment, a digital map of the surroundings, which describes the surrounding region, is updated on the basis of the classification of the object. Moreover, a digital map of the surroundings, which describes the surrounding region, can be provided by the control device. The objects that are captured by the at least one distance sensor can be entered into the digital map of the surroundings. Consequently, it is possible to ascertain, for example, whether a collision between the motor vehicle and one of the objects or obstacles is imminent. Here, it is necessary, in particular, for the digital map of the surroundings to be constantly updated. Thus, it is possible, for example, to delete objects from the digital map of the surroundings which are no longer arranged in the surrounding region of the motor vehicle. If the object is reliably identified as a static object, it is possible to reliably determine that the motor vehicle would move past this static object and consequently no collision with the object can be imminent. Consequently, a reliable operation of the motor vehicle can be facilitated.

A control device according to the invention for a motor vehicle is designed to carry out a method according to the invention. In particular, the control device can be an electronic controller of the motor vehicle. An appropriate program to be able to carry out the method according to the invention and the developments thereof can be made to run on the control device.

A driver assistance system according to the invention comprises a distance sensor, in particular a radar sensor, and the control device according to the invention. Here, provision can also be made for the driver assistance system to comprise a plurality of distance sensors or radar sensors, which are arranged at the motor vehicle in a distributed manner. By way of example, the driver assistance system can be embodied for monitoring the blind spot, for providing a collision warning or the like. The driver assistance system can also be embodied as a lane change assistant.

Preferably, the driver assistance system is configured to output control signals for at least semiautonomous manoeuvring of the motor vehicle. Using the control device, it is possible to localize and classify the object in the surrounding region of the motor vehicle. Consequently, it is possible to determine, for example, whether a collision with the object is imminent. If a collision with the object is imminent, the control device can output appropriate control signals to the drive motor, a braking installation and/or a steering system of the motor vehicle. Consequently, the motor vehicle can be manoeuvred by an appropriate intervention in the brake and/or the steering system, for example, in such a way that a collision between the motor vehicle and the object is prevented. Provision can also be made of outputting a warning to the driver depending on the control signals.

A motor vehicle according to the invention comprises a driver assistance system according to the invention. In particular, the motor vehicle is embodied as a motor car.

The preferred embodiments presented with reference to the method according to the invention, and the advantages thereof, apply mutatis mutandis to the control device according to the invention, the driver assistance system according to the invention and the motor vehicle according to the invention.

Further features of the invention emerge from the claims, the figures and the description of the figures. The features and feature combinations specified above in the description and the features and feature combinations specified below in the description of the figures and/or only shown in the figures can be used not only in the respectively specified combination, but also in other combinations or on their own, without departing from the scope of the invention. Consequently, embodiments which are not explicitly shown and explained in the figures but which emerge, and can be produced, from the explained embodiments by separate feature combinations should also be considered to be comprised and disclosed by the invention. Embodiments and feature combinations which consequently do not have all features of an originally phrased independent claim should also be considered to be disclosed.

The invention will now be explained in more detail on the basis of preferred exemplary embodiments and with reference to the attached drawings.

In detail:

Identical and functionally identical elements are provided with the same reference signs in the figures.

Figure 1:
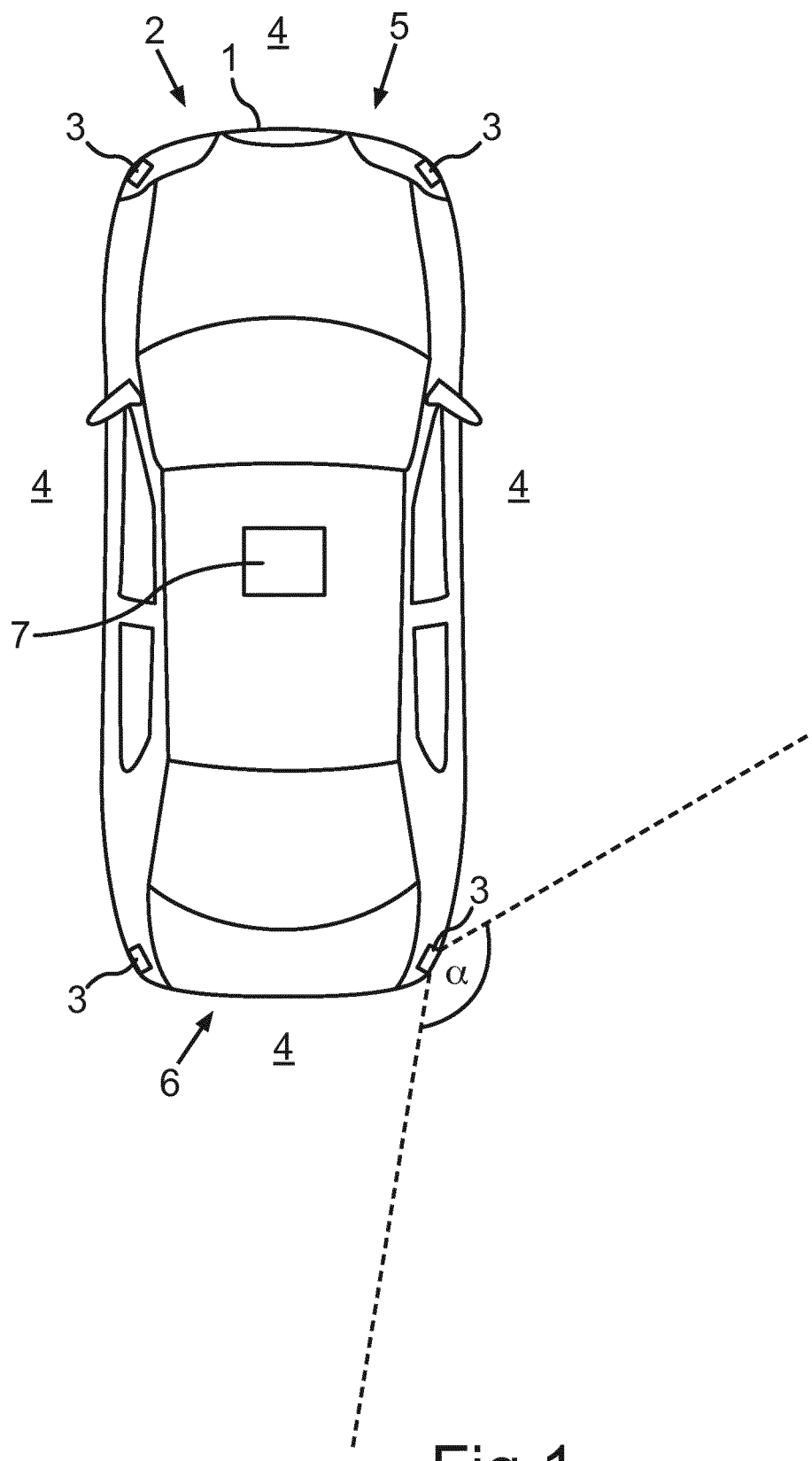
FIG. 1 shows a schematic illustration of a motor vehicle according to an embodiment of the present invention, said motor vehicle comprising a driver assistance system with a plurality of radar sensors.

FIG. 1 shows a motor vehicle 1 according to an embodiment of the present invention in a plan view. The motor vehicle 1 is embodied as a motor car in the present exemplary embodiment. The motor vehicle 1 comprises a driver assistance system 2, which can be embodied as an adaptive cruise control, a blind spot assistant, a lane keeping assistance and/or a lane change assistant, for example.

The driver assistance system 2 comprises at least one distance sensor 3 that can be used to capture at least one object 8 (see FIG. 2) in a surrounding region 4 of the motor vehicle 1. In the present exemplary embodiment, the driver assistance system 2 comprises four distance sensors 3, each of which is embodied as a radar sensor. Using the radar sensors, it is possible to emit a transmission signal in the form of electromagnetic radiation, which is reflected by the object 8. The reflected electromagnetic radiation returns to the respective distance sensor 3 or radar sensor again as an echo signal. A distance between the distance sensor 3 and the object 8 can be determined on the basis of the time-of-flight. In the present case, two radar sensors are arranged in a front region 5 and two radar sensors are arranged in a tail region 6 of the motor vehicle 1. By way of example, the distance sensors 3 or the radar sensors can be arranged covered behind a bumper of the motor vehicle 1. Using the respective radar sensors, it is possible to capture an azimuthal angle range $\alpha$ in the horizontal direction, said azimuthal angle range being able to lie in a range between 150° and 180°. This azimuthal angle range $\alpha$ is shown in an exemplary manner for the rear right distance sensor 3. The radar sensors are capable of capturing objects 8 up to a distance of 80 to 100 m.

Moreover, the driver assistance system 2 comprises a control device 7, which may be formed by a computer, a digital signal processor, a microprocessor or the like, for example. In particular, the control device 7 can be formed by an electronic controller of the motor vehicle 1. The control device 7 is connected to the distance sensors 3 for data transmission purposes. Appropriate data lines are not illustrated in the present case for reasons of clarity. Consequently, the sensor data, which are captured by the distance sensors 3 and which describe the surrounding region 4, can be transmitted from the distance sensors 3 to the control device 7. Then, the control device 7 can evaluate the sensor data appropriately. Moreover, the control device 7 can receive data from sensors, which describe the current speed and/or the current steering angle of the motor vehicle 1.

Figure 2:
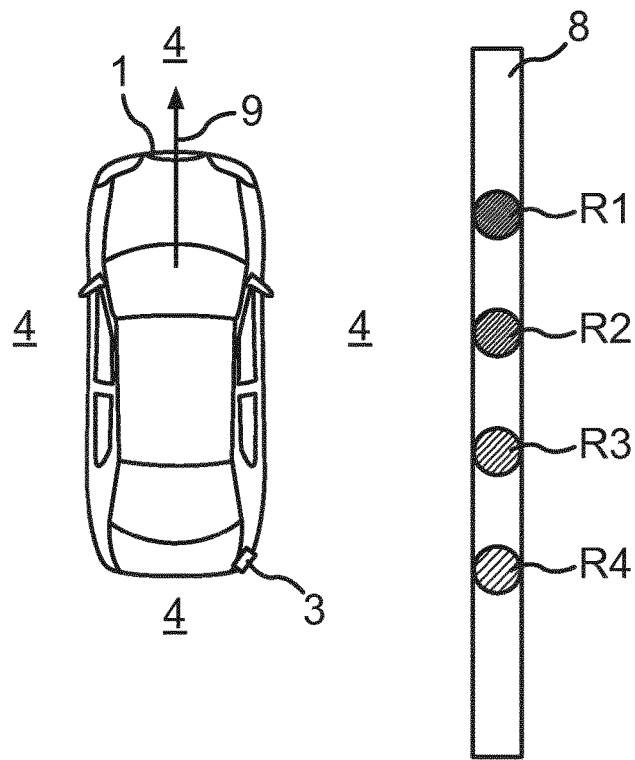
FIG. 2 shows the motor vehicle that is moved relative to an object.

FIG. 2 shows the motor vehicle 1 according to FIG. 1, which is moved relative to an object 8 situated in the surrounding region 4. In the present case, the object 8 is a stationary object, in particular a crash barrier. In the present case, the motor vehicle 1 is moved substantially in parallel to the object 8 or the crash barrier. Here, the arrow 9 describes the current direction of travel and/or the current speed of the motor vehicle 1. The object 8 or the crash barrier can be captured with the aid of the distance sensors 3, in particular with the aid of the distance sensor 3 that is arranged in the right tail region 6 of the motor vehicle 1. It is possible, in particular, to capture predetermined points of reflection R1, R2, R3, R4 at the object 8 or track these as a function of time. By way of example, during the evaluation of the sensor signals, the points of reflection R1, R2, R3, R4 can be identified as individual points that are arranged along a line. For the purposes of tracking the points of reflection R1, R2, R3, R4, a so-called tracking function, by means of which the points of reflection R1, R2, R3, R4 can be followed or tracked as a function of time, can be provided, for example by means of the control device 7. The control device 7 can also provide a digital map of the surroundings, which describes the surrounding region 4. The objects 8 that were captured by the distance sensors 3 can be entered into this digital map of the surroundings.

Figure 3:
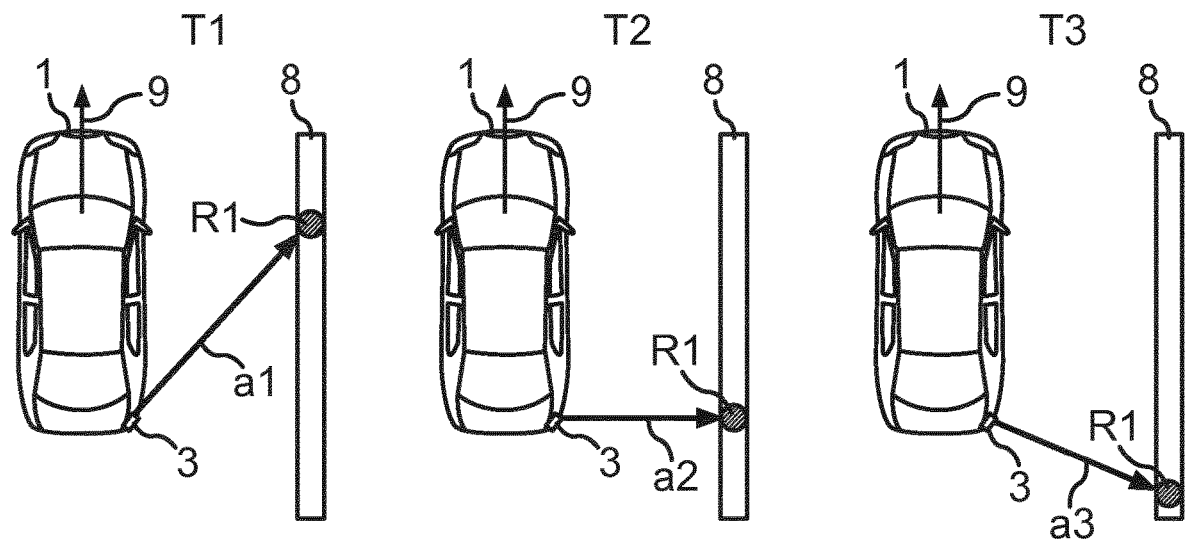
FIG. 3 shows the motor vehicle and the object at three different times, wherein a distance value, which describes the distance between the radar sensor and a point of reflection of the object, is determined in each case.

FIG. 3 shows the object 8 being captured by one of the distance sensors at three different times T1, T2 and T3. The times T1, T2 and T3 can be assigned to respective measurement cycles, in which objects 8 in the surrounding region 4 are captured by the distance sensor 3. In the present case, the first point of reflection at the object or at the crash barrier is captured at the three predetermined times T1, T2 and T3. As can be identified in the left-hand region of FIG. 3, the motor vehicle 1 is moved substantially in parallel to the object 8 or the crash barrier along the arrow 9. The distance sensor 3 that is arranged bottom right at the motor vehicle 1 therefore moves towards the first point of reflection R1. The control device 7 is able to determine a first distance value a1, which describes the distance between the distance sensor 3 and the point of reflection R1 at the time T1, on the basis of the sensor data that are provided by the distance sensor 3.

A central region of FIG. 3 illustrates the capture of the object 8 at a time T2 following the time T1. Here, the point of reflection R1 is situated on a perpendicular to the longitudinal axis of the motor vehicle 1 extending through the distance sensor 3. The distance sensor 3 and the point of reflection R1 have the shortest distance from one another at the time T2. This is described by the distance value a2, which is determined on the basis of the sensor data by the control device 7.

A right-hand region of FIG. 3 shows the capture of the object 8 at a time T3, which follows the time T2 in time. Here, the motor vehicle 1 was moved further along the direction of the arrow 9. The point of reflection R1 is already situated behind the distance sensor 3. The distance value a3, which is determined by the control device 7 on the basis of the sensor data, describes the distance between the distance sensor 3 and the point of reflection R1.

Figure 4:
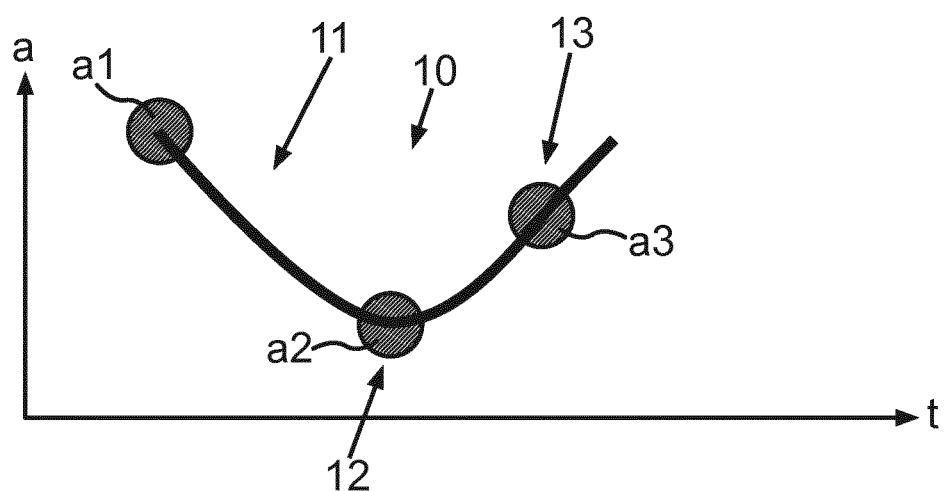
FIG. 4 shows a curve of the distance values as a function of time.

FIG. 4 shows a curve 10 of the distance values a as a function of time t. In the present case, the distance values a1, a2 and a3, which were ascertained in the measurement cycles according to FIG. 3, are moreover plotted. Here, it is possible to identify that the curve 10 initially drops in a first region 11. In a second region 12, which is assigned to the second distance value a2, the curve has a minimum. A rising curve emerges in a third region 13. The curve 10 of the distance values a is substantially parabolic as a function of time t. This emerges as a result of the distance sensor 3 initially being moved towards the point reflection R1 and subsequently being moved away therefrom again. This curve 10 is typical for stationary objects 8, in particular crash barriers, in relation to which the motor vehicle 1 is moved substantially in parallel. This curve 10 can be compared by the control device 7 to a predetermined reference curve, which is saved in a memory unit of the control device 7, for example. Consequently, the object 8 can easily be classified as a static object, in particular as a crash barrier.

The invention claimed is:

1. A method for capturing a surrounding region of a motor vehicle for a driver assistance system of the motor vehicle, the method comprising:
   while the motor vehicle is moved relative to an object in the surrounding region, receiving, by a control device of the driver assistance system, sensor data at predetermined times from a distance sensor;
   determining a plurality of points of reflection of the object on the basis of the received sensor data, wherein the plurality of points of reflection are determined at a single point in time and represent a region on an outer side of the object, facing the distance sensor, at which transmission signals of the distance sensor are reflected off the object;
   determining a distance value by the control device for each of the predetermined times on the basis of the sensor data, said distance values each comprising a distance between the distance sensor and one point of the plurality of points of reflection of the object, wherein the one point of the plurality of points of reflection is the same point of reflection identified and tracked as a function of time by the control device; and
   classifying the object as a static or a moving object, by the control device, on the basis of the received sensor data by comparing a curve of the distance values as a function of the predetermined times to a predetermined parabolic reference curve.

2. The method according to claim 1,
   wherein the distance sensor has an azimuthal angle range subdivided into portions irradiated in succession by a sequence of signals reflected from the at least one point of reflection of the object, and
   wherein the object is classified as a static object when the distance value as the function of the predetermined times is similar to the reference curve in which both the reference curve and the distance value as the function of the predetermined times initially drop and subsequently rise.

3. The method according to claim 1, wherein the object is classified as a static object, in relation to which the motor vehicle is moved substantially in parallel, when the curve of the distance values as a function of time is similar to the reference curve in which both the reference curve and the curve of the distance values as a function of time are parabolic.

4. The method according to claim 3, wherein the object is classified as a crash barrier when the curve of the distance values as a function of time is similar to the reference curve in which both the reference curve and the curve of the distance values as a function of time are parabolic.

5. The method according to claim 1, wherein a distance between the motor vehicle and the object is determined on the basis of a minimum of the distance values.

6. The method according to claim 1, wherein a digital map of the surroundings, which describes the surrounding region, is updated on the basis of the classification of the object.

7. A control device for a motor vehicle, wherein the control device configured to perform the method according to claim 1.

8. A driver assistance system comprising a radar sensor; and a control device according to claim 7.

9. The driver assistance system according to claim 8, wherein the driver assistance system is configured to output control signals for at least semiautonomous maneuvering of the motor vehicle.

10. A motor vehicle having a driver assistance system according to claim 9.

* * * * *